US009135369B2

(12) United States Patent
Castonguay et al.

(10) Patent No.: US 9,135,369 B2
(45) Date of Patent: Sep. 15, 2015

(54) SYSTEM, METHOD, AND COMPUTER PROGRAM PRODUCT FOR PERFORMING GRAPH AGGREGATION

(75) Inventors: Patrice Castonguay, Menlo Park, CA (US); Jonathan Michael Cohen, Ann Arbor, MI (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 13/462,749

(22) Filed: May 2, 2012

(65) Prior Publication Data
US 2013/0297631 A1 Nov. 7, 2013

(51) Int. Cl.
*G06F 17/30* (2006.01)

(52) U.S. Cl.
CPC ............................... *G06F 17/30958* (2013.01)

(58) Field of Classification Search
CPC ... G06T 7/0093; G06F 15/16; G06F 11/3608; G06F 17/30867; G06K 9/481
USPC ......................................................... 707/758
See application file for complete search history.

(56) References Cited

U.S. PATENT DOCUMENTS

| 7,283,611 | B1 * | 10/2007 | Luan et al. ....................... 378/65 |
| 2002/0030677 | A1 * | 3/2002 | Huang et al. ................... 345/420 |
| 2002/0059501 | A1 | 5/2002 | McKinney et al. |
| 2003/0069908 | A1 * | 4/2003 | Anthony et al. ............... 707/513 |
| 2003/0182310 | A1 * | 9/2003 | Charnock et al. .......... 707/104.1 |
| 2005/0099420 | A1 * | 5/2005 | Hoppe ........................... 345/420 |
| 2006/0190105 | A1 * | 8/2006 | Hsu et al. ......................... 700/86 |
| 2006/0274062 | A1 * | 12/2006 | Zhang et al. .................... 345/420 |
| 2010/0165090 | A1 * | 7/2010 | Sweeney et al. ................. 348/77 |
| 2010/0189316 | A1 * | 7/2010 | Walch ............................ 382/125 |
| 2011/0268364 | A1 | 11/2011 | Hido |
| 2012/0317142 | A1 * | 12/2012 | Broecheler et al. ........... 707/770 |
| 2013/0222388 | A1 | 8/2013 | McDonald |

OTHER PUBLICATIONS

Duan, R. et al., "Approximating Maximum Weight Matching in Near-linear Time," 51st Annual IEEE Symposium on Foundations of Computer Science (FOCS), 2010, pp. 673-682.
Vasconcelos, C. N. et al., "Bipartite Graph Matching Computation on GPU," Proceedings of the 7th International Conference on Energy Minimization Methods in Computer Vision and Pattern Recognition, 2009, pp. 42-55.
Fagginger Auer, B. O. et al., "A GPU Algorithm for Greedy Graph Matching," Lecture Notes in Computer Science, 2012, vol. 7174, pp. 108-119.
Karpinski, M. et al., "Fast Parallel Algorithms for Graph Matching Problems," Oxford Lecture Series in Mathematics and Its Applications, Oxford University Press, Inc., 1998, pp. 48-49 and 101-102.
Kim, H. et al., "A multigrid method based on graph matching for convection-diffusion equations," Numerical Linear Algebra with Applications, 2003, vol. 10, pp. 181-195.

(Continued)

*Primary Examiner* — Sherief Badawi
*Assistant Examiner* — Courtney Harmon
(74) *Attorney, Agent, or Firm* — Zilka-Kotab, PC

(57) ABSTRACT

A system, method, and computer program product are provided for performing graph aggregation. In use, a graph with a plurality of vertices and a plurality of edges is identified. Additionally, aggregation is performed on the vertices and edges of the graph by computing a graph matching, where such graph matching is performed in a data-parallel manner.

20 Claims, 7 Drawing Sheets

(56) References Cited

OTHER PUBLICATIONS

Patwary, Md. M. A., "Parallel Graph Algorithms for Combinatorial Scientific Computing," Dissertation, Feb. 2011.

Patwary, Md. M. A. et al., "Parallel Greedy Graph Matching using an Edge Partitioning Approach," Proceedings of the fourth international workshop on High-level parallel programming and applications, 2010, pp. 45-54.

Hougardy, S. et al., "Approximating Weighted Matchings in Parallel," Information Processing Letters, 2006, vol. 99, No. 3, pp. 119-123.

Hoepman, J.-H., "Simple Distributed Weighted Matchings," Oct. 19, 2004, pp. 1-7.

Cohen, J. M. et al., U.S. Appl. No. 13/461,710, filed May 1, 2012.

Cohen, J. M., U.S. Appl. No. 13/461,720, filed May 1, 2012.

Cohen, J. M. et al., U.S. Appl. No. 13/462,757, filed May 2, 2012.

Bell, N. et al., "Exposing Fine-Grained Parallelism in Algebraic Multigrid Methods," Technical Report NVR-2011-002, Jun. 2011, pp. 1-30.

Gee, M. W. et al., "ML 5.0 Smoothed Aggregation User's Guide," SAND2006-2649, Feb. 2007, pp. 3-66.

Karypis, G. et al., "Parallel Multilevel k-Way Partitioning Scheme for Irregular Graphs," Society for Industrial and Applied Mathematics, 1999, vol. 41, No. 2, pp. 278-300.

Kim, H.H. et al., "A multigrid method based on graph matching for convection-diffusion equations," Numerical Linear Algebra with Applications, 2003, vol. 10, pp. 181-195.

Notay, Y., "An Aggregation-Based Algebraic Multigrid Method," Electronic Transactions on Numerical Analysis, 2010, vol. 37, pp. 123-146.

Non-Final Office Action from U.S. Appl. No. 13/462,757, dated Jun. 19, 2014.

El Hibaoui, A. et al., "Analysis of a Randomized Dynamic Timetable Handshake Algorithm," Laboratoire Bordelais de Recherche en Informatique (LaBRI), Apr. 16, 2009, pp. 159-169.

Metivier, Y. et al., "Analysis of a randomized rendezvous algorithm," Information and Computation 184, 2003, pp. 108-128.

Zemmari, A., "On handshakes in random graphs," Information Processing Letters 108, 2008, pp. 119-123.

Notice of Allowance from U.S. Appl. No. 13/462,757, dated Dec. 11, 2014.

* cited by examiner

SYSTEM, METHOD, AND COMPUTER PROGRAM PRODUCT FOR PERFORMING GRAPH AGGREGATION

FIELD OF THE INVENTION

The present invention relates to performing aggregation within a graph, and more particularly to performing graph matching.

BACKGROUND

Performing aggregation within a graph can result in simpler, more efficient decision making. For example, aggregation may be performed to simplify a high resolution problem by creating a lower resolution problem that may be easier to solve. However, current techniques for performing aggregation within a graph have been associated with various limitations.

For example, current implementations for performing aggregation within a graph have shown a variety of inefficiencies which may be amplified as data sets utilized during the aggregation increase in size. Furthermore, current implementations may show inefficiencies due to the fact that such implementations may be performed only utilizing serial methodologies. There is thus a need for addressing these and/or other issues associated with the prior art.

SUMMARY

A system, method, and computer program product are provided for performing graph aggregation. In use, a graph with a plurality of vertices and a plurality of edges is identified. Additionally, aggregation is performed on the vertices and edges of the graph by computing a graph matching, where such graph matching is performed in a data-parallel manner.

DETAILED DESCRIPTION

Figure 1:
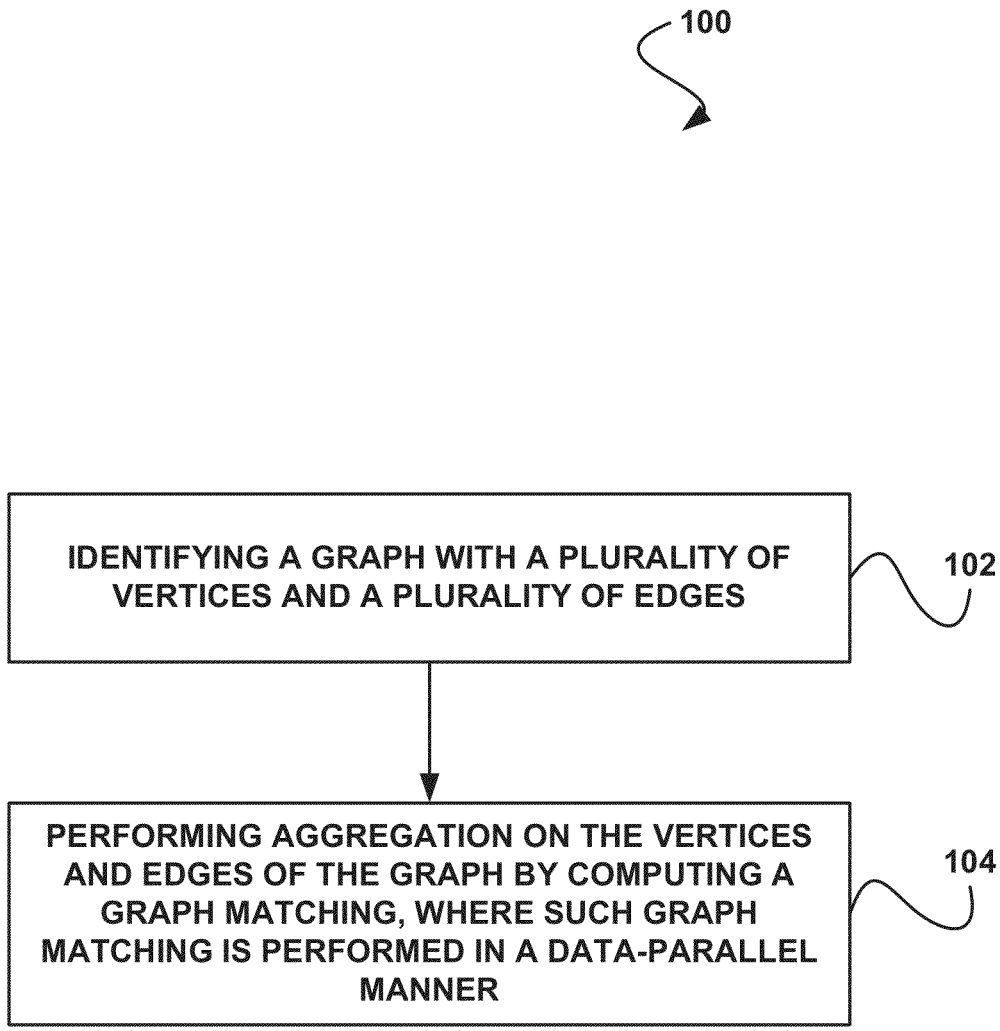
FIG. 1 shows a method for performing graph aggregation, in accordance with one embodiment.

FIG. 1 shows a method 100 for performing graph aggregation, in accordance with one embodiment. As shown in operation 102, a graph with a plurality of vertices and a plurality of edges is identified. In one embodiment, the graph may include a representation of the plurality of vertices, where each vertex of the plurality of vertices is connected to each of one or more of the other vertices by an edge (e.g., a link, etc.). In another embodiment, each of the plurality of vertices (e.g., nodes, etc.) may represent a distinct object (e.g., a data element, etc.), such that the plurality of vertices of the graph represents a set of objects. In yet another embodiment, each edge of the graph may represent an association between the vertices directly connected by the edge. For example, two vertices directly connected by an edge may share a dependency, a contention, etc.

Additionally, in one embodiment, the graph may be representative of another environment. For example, the graph may represent the geometry of a space (e.g., a "mesh," etc.) subdivided a plurality of geometric elements (e.g., tetrahedral, cubes, etc.), where each vertex in the graph may correspond to a region of the space, and each edge may indicate that two regions of the space are adjacent to each other.

Additionally, as shown in operation 104, aggregation is performed on the vertices and edges of the graph by computing a graph matching, where such graph matching is performed in a data-parallel manner. In one embodiment, performing aggregation on the vertices and edges of the graph may include grouping a plurality of vertices and one or more edges of the graph. For example, performing aggregation on the vertices and edges of the graph may include merging a plurality of vertices of the graph and one or more edges of the graph into a single new vertex of the graph.

Further, in one embodiment, performing the aggregation may include creating a plurality of new vertices for the graph. For example, a plurality of instances of vertices and one or more edges of the graph may each be grouped to create a plurality of new vertices. In yet another embodiment, one or more new edges may be created within the graph. For example, one or more new edges may be created within the graph in order to connect one or more new vertices within the graph.

Further still, in one embodiment, the graph matching may be performed on the vertices and edges of the graph. In one embodiment, performing graph matching on the vertices and edges of the graph may include determining a set of one or more edges within the graph that do not have a vertex in common (e.g., an independent set of edges, etc.). In another embodiment, the aggregation on the vertices and edges of the graph may be performed as part of a multigrid method (e.g., an algebraic multigrid (AMG) method such as an aggregation AMG, etc.). For example, the aggregation on the vertices and edges of the graph may be performed in order to construct a coarse operator for an AMG method.

Also, in one embodiment, performing the graph matching in a data-parallel manner may include considering each element (e.g., all vertices and edges) in the graph independent of all other elements in the graph during the performance of the graph matching. For example, for any two vertices within the graph, it may not be required that one of the two vertices be processed before the other vertex during the performance of the graph matching.

In another embodiment, performing the graph matching in a data-parallel manner may include performing the graph matching by a data parallel graph matching method. In another embodiment, the graph matching may be performed utilizing a data parallel architecture. For example, the graph matching may be performed utilizing a method that is run on a data parallel architecture (e.g., a graphics processing unit (GPU) architecture, etc.).

In addition, in one embodiment, the graph matching may be performed in a data-parallel manner utilizing a one-phase handshaking method. For example, utilizing the one-phase handshaking method, a single vertex within the graph may select one neighbor vertex. In another embodiment, the neighbor vertex may include a vertex that is directly connected to the single vertex by a link within the graph (e.g., a vertex not connected to the single vertex through another vertex, etc.). In yet another embodiment, the selection of a neighbor vertex by the single vertex may include the single vertex "extending a hand" to that neighbor vertex. For example, an indication of a one-sided connection from the single vertex to the neighbor vertex may be recorded, an edge between the single vertex and the neighbor vertex may be selected, etc.

Further, in one embodiment, utilizing the one-phase handshaking method, the single vertex within the graph may select the neighbor vertex according to one or more criteria. For example, the single vertex within the graph may select the neighbor vertex according to a maximal matching criteria, maximal weighted matching criteria, etc. In another example, the single vertex within the graph may select the neighbor vertex randomly. In yet another embodiment, utilizing the one-phase handshaking method, each vertex within the graph may select one neighbor vertex.

Further still, in one embodiment, utilizing the one-phase handshaking method, it may be determined for each vertex within the graph whether a mutual selection (e.g., "mutual handshake," etc.) exists between the vertex and another vertex of the graph. For example, for a particular vertex in the graph, it may be determined whether that particular vertex was selected (e.g., whether the vertex "received a hand," etc.) by a vertex that the particular vertex had also selected. In another example, it may be determined whether two vertices within the graph that share an edge both selected the shared edge connecting them.

Also, in one embodiment, utilizing the one-phase handshaking method, if it is determined that a mutual selection exists between two vertices of the graph, those two vertices may be merged within the graph. For example, merging two vertices may include collapsing the two vertices and their shared edge into a single new vertex. In another embodiment, merging of vertices may be independently performed for all vertices demonstrating mutual selection within the graph.

Additionally, in one embodiment, the one-phase handshaking method may be performed over a plurality of iterations. For example, the one-phase handshaking method may be performed on a graph, and after all vertices demonstrating mutual selection have been merged within the graph during a first iteration, the one-phase handshaking method may again be performed on all non-merged vertices of the graph during a second iteration. In another embodiment, the one-phase handshaking method may be performed until one or more criteria are met. For example, the one-phase handshaking method may be performed until a predetermined number or percentage of vertices are merged, until a predetermined number of iterations are performed, etc.

Furthermore, in one embodiment, the graph matching may be performed in a data-parallel manner utilizing a two-phase handshaking method. For example, utilizing the two-phase handshaking method, each vertex within the graph may select their strongest neighbor vertex (e.g., their neighbor containing the most edges, etc.) as a first neighbor vertex (e.g., by "extending a first hand" to the first neighbor vertex, selecting an edge connecting the vertex to their first neighbor vertex, etc.). Additionally, each vertex within the graph may identify other vertices within the graph that selected that vertex (e.g., by "extending a first hand" to that vertex). Further, each vertex within the graph may determine a strongest selecting vertex from the other vertices within the graph that selected that vertex, where such strongest selecting vertex contains the most edges of all the vertices within the graph that selected that vertex.

Further still, each vertex within the graph may select their strongest selecting vertex as a second neighbor vertex (e.g., by "extending a second hand" to the strongest selecting vertex, selecting an edge connecting the vertex to the strongest selecting vertex, etc.). In another embodiment, all edges within the graph that were not selected by both vertices connected by the edge may be removed from the graph. In yet another embodiment, the one-phase handshaking method may be performed on the remaining vertices and edges of the graph.

In this way, aggregation may be performed within the graph utilizing a parallel graph matching method on a parallel architecture (e.g., a graphics processing unit (GPU), etc.) to create a lower resolution (e.g., "coarser") graph that may be simpler to solve than the original graph. Additionally, a set-up phase of a multi-grid method (e.g., AMG method) may be parallelized through the use of a parallel graph matching method.

Additionally, utilizing the parallel graph matching method, graph coloring may not be required. Also, a greedy method may be avoided. Further, all of the vertices of the graph may be processed in parallel. Further still, the parallel graph matching method may be implemented in the context of a multigrid algorithm. Also, in another embodiment, the graph matching may be performed in a data-parallel manner utilizing an auction method.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
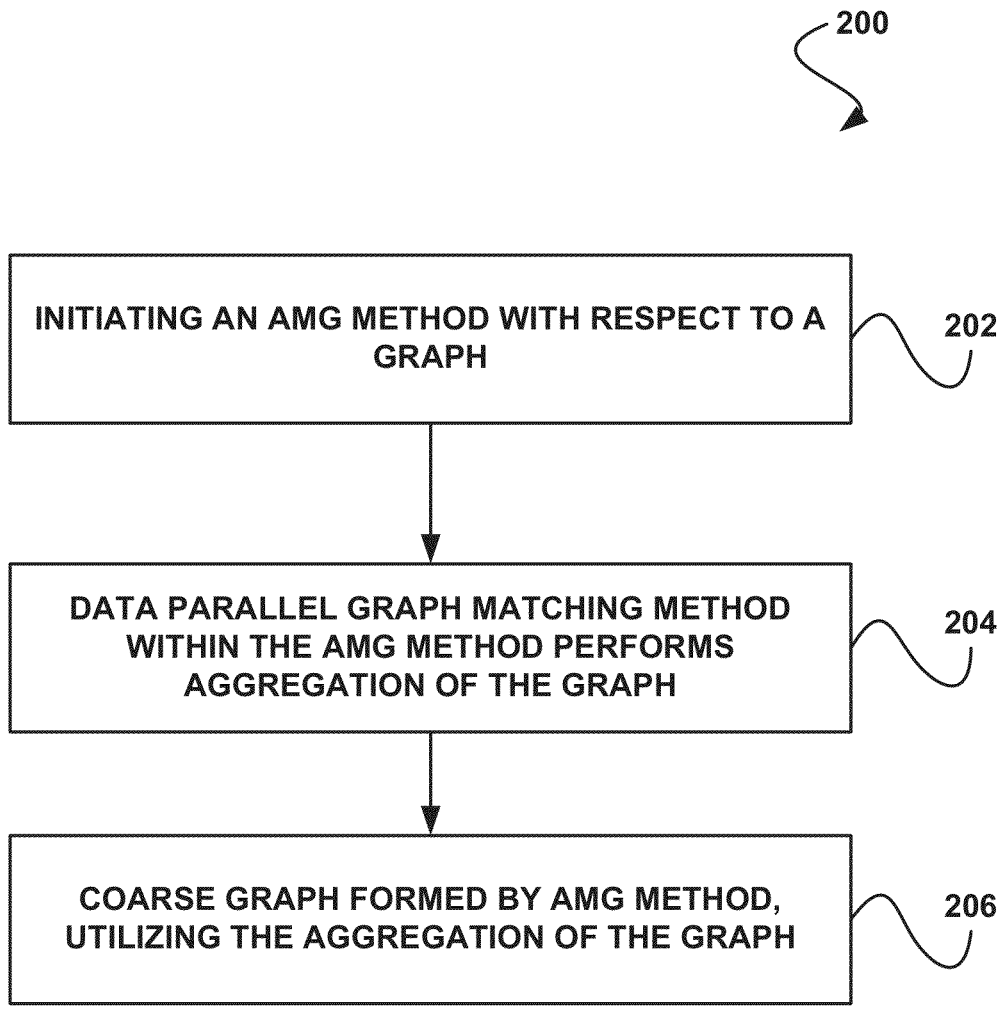
FIG. 2 shows an algebraic multigrid method implementation, in accordance with another embodiment.

FIG. 2 shows an algebraic multigrid method implementation 200, in accordance with another embodiment. As an option, the implementation 200 may be carried out in the context of the functionality of FIG. 1. Of course, however, the implementation 200 may be implemented in any desired environment. It should also be noted that the aforementioned definitions may apply during the present description.

As shown in operation 202, an algebraic multigrid (AMG) method is initiated with respect to a graph. In one embodiment, the AMG method may include a method for solving sparse linear systems of equations. It may be used in areas such as fluid simulation (CFD), reservoir simulation, and other engineering applications. In another embodiment, the AMG method may include an aggregation AMG method. For example, the AMG method may involve performing aggregation of the graph.

Additionally, as shown in operation 204, a data parallel graph matching method within the AMG method performs an aggregation of the graph. In one embodiment, the graph may include a plurality of vertices and edges, and performing an aggregation of the graph may include grouping one or more vertices and edges of the graph into clusters. In another embodiment, a graph matching may include a set of edges in a graph such that no two edges in the set share a vertex.

Table 1 illustrates an exemplary method for performing an aggregation on a graph. In one embodiment, the exemplary aggregation method illustrated in Table 1 may be used to determine aggregates of vertices where each aggregate contains a number of vertices that is a power of two. Of course, it should be noted that the method shown in Table 1 is set forth for illustrative purposes only, and thus should not be construed as limiting in any manner.

TABLE 1

```
SelectAggregatesPowerOf2(Verts, Edges, targetsize) {
    Verts[0] = Verts;
    Edges[0] = Edges;
    for (i=0; i < log2(targetsize); i++) {
        M = Matching(Verts[i], Edges[i]);
        (Verts[i+1], Edges[i+1]) = EdgeCollapse(Verts[i], Edges[i], M);
    }
    for (every v in Verts[0]) {
        Aggregates[v.after_collapse->after_collapse->...->
after_collapse].push_back(v);
    }
    return Aggregates;
}
```

Table 2 illustrates another exemplary method for performing an aggregation on a graph. In one embodiment, the method in Table 2 may be used to determine aggregates of vertices where each aggregate contains a number of vertices that is not a power of two. Of course, it should be noted that the method shown in Table 2 is set forth for illustrative purposes only, and thus should not be construed as limiting in any manner.

TABLE 2

```
SelectAggregates(Verts, Edges, targetsize) {
    int base_size = round_down_to_nearest_power_of2(targetsize);
    Verts[0] = Verts;
    Edges[0] = Edges;
    for (1=0; i < log2(base_size); i++) {
        M = Matching(Verts[i], Edges[i]);
        (Verts[i+1], Edges[i+1]) = EdgeCollapse(Verts[i], Edges[i], M);
    }
    for (every v in Verts[0]) {
        count[v.after_collapse->after_collapse-> ... ->after_collapse]++;
    }
    // remove edges that would result in aggregates which are too large
    for (every e in Edges[i+1]) {
        if (count[e.vertex0]+count[e.vertex1]) > targetsize)
            Edges[i+1].remove(e);
    }
    // do matching and collapses as before
    M = Matching(Verts[i+1], Edges[i+1])
    (Verts[i+2], Edges[i+2]) = EdgeCollapse(Verts[i+1], Edges [i+1], M);
    for (every v in Verts[0]) {
        Aggregates[v.after_collapse->after_collapse->...->
after_collapse].push_back(v);
    }
    return Aggregates:
}
```

In one embodiment, the method "Matching(Verts,Edges)" shown above in Tables 1 and 2 may include a method to compute a graph matching, given a plurality of vertices ("Verts") and a plurality of edges ("Edges") of a graph. In yet another embodiment, the function "EdgeCollapse" shown above in Tables 1 and 2 may take a graph and a set of edges as input, and may return a new graph where each of the listed edges has been "collapsed" in that sense that an edge (v1,v2) connecting two vertices results in a new vertex "v1v2" and any incident edges (a,v1) or (a,v2) are replaced with an edge in this new graph (a,v1v2).

In addition, in one embodiment, when a set of edges to collapse form a graph matching (that is, they have no vertices in common), these collapsed may all be computed in parallel. In another embodiment, the edge collapse routine may be implemented as a special form of a sparse matrix-matrix product. In yet another embodiment, after a collapse, every vertex that was collapsed may maintain a reference to the new vertex (e.g., "v1.after_collapse=v1v2").

Further, as shown in operation 206, a coarse graph is formed by the algebraic multigrid (AMG) method, utilizing the aggregation of the graph. In this way, arbitrary sized aggregates of high quality may be computed for a general sparse graph, in a manner suitable for implementation on a data parallel architecture such as a GPU.

Figure 3:
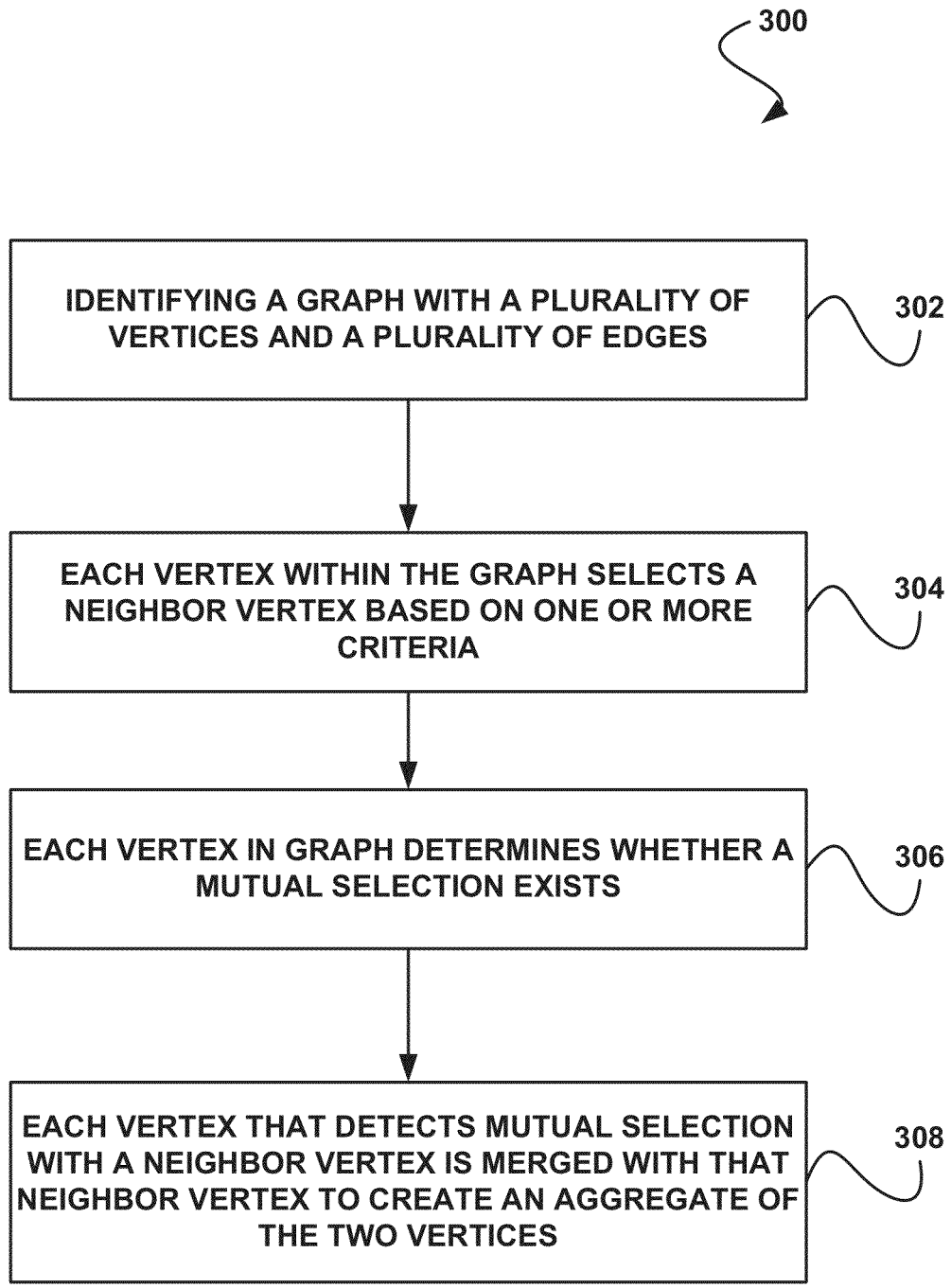
FIG. 3 shows a one-phase handshaking method for performing graph matching in parallel in accordance with yet another embodiment.

FIG. 3 shows a one-phase handshaking method 300 for performing graph matching in parallel, in accordance with another embodiment. As an option, the method 300 may be carried out in the context of the functionality of FIGS. 1 and 2. Of course, however, the method 300 may be implemented in any desired environment. It should also be noted that the aforementioned definitions may apply during the present description.

As shown in operation 302, a graph with a plurality of vertices and a plurality of edges is identified. Additionally, as shown in operation 304, each vertex within the graph selects a neighbor vertex based on one or more criteria. In one embodiment, each vertex may select a neighbor vertex that has the highest total weight of all neighbor vertices. In another embodiment, each vertex may select a neighbor vertex in a random fashion. Of course, however, each vertex may select a neighbor vertex based on any criteria.

Figure 4:
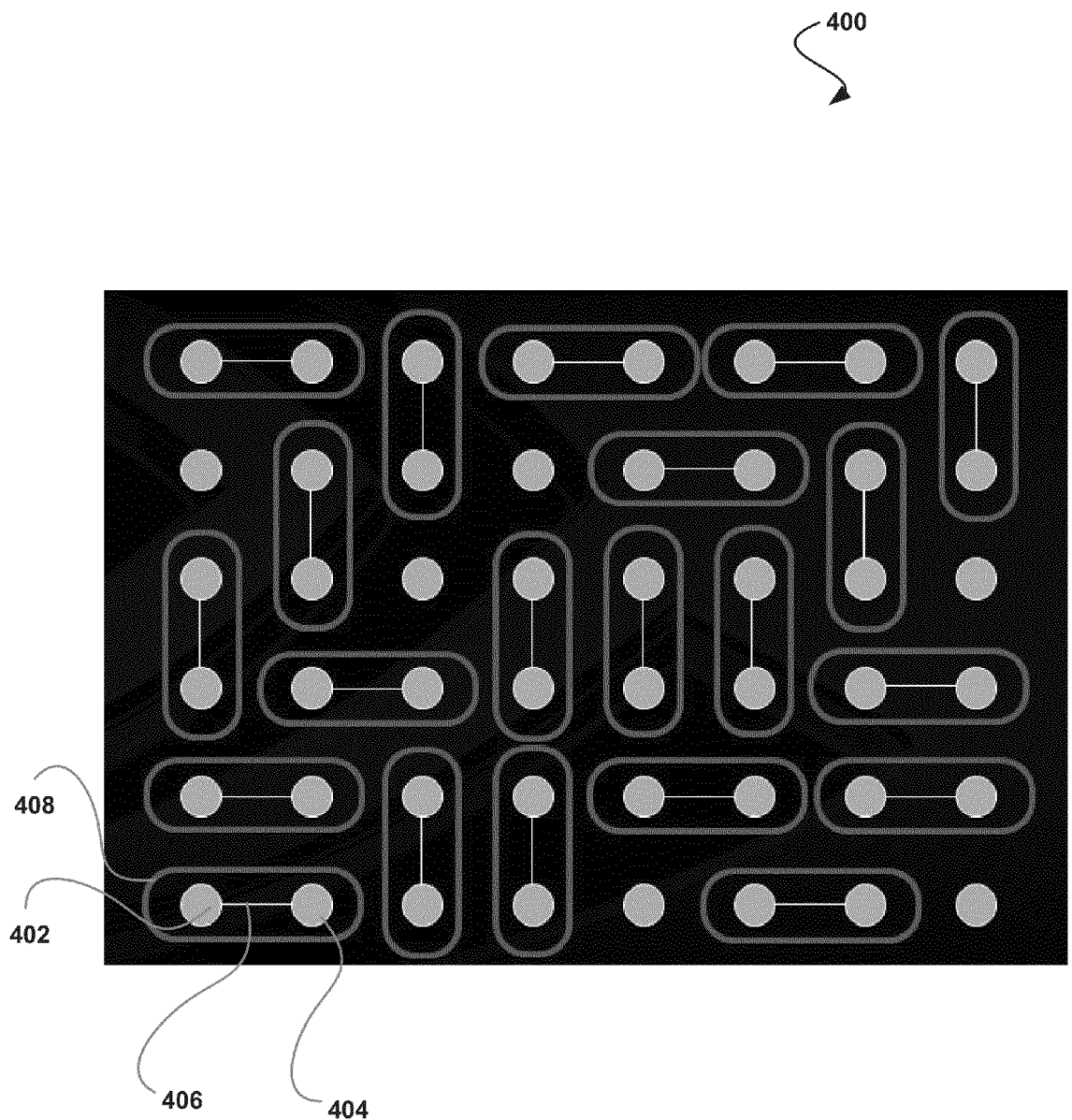
FIG. 4 shows an exemplary graph, in accordance with yet another embodiment.

Further, as shown in operation 306, each vertex in the graph determines whether a mutual selection exists between the vertex and a neighbor vertex of the graph. For example, each vertex in the graph may determine whether their selected neighbor vertex has also selected them during the selection performed in operation 304. Further still, as shown in operation 308, each vertex that detects mutual selection with a neighbor vertex is merged with that neighbor vertex to create an aggregate of the two vertices. For example, an exemplary graph is shown in FIG. 4 where a vertex 402 detects a mutual selection with a neighbor vertex 404 along an edge 406, and where that vertex 402, its neighbor vertex 404, and the edge 406 are merged to form an aggregate 408.

Also, in one embodiment, the one-phase handshaking method 300 may be iteratively repeated until all vertices or a predetermined amount of vertices of the graph are merged to form new vertices. In another embodiment, any vertices that have not been merged after a predetermined number of merges or a predetermined number of iterations may be left alone or merged with another pair of vertices that has already been merged.

Additionally, in one embodiment, merged aggregates of two vertices within the graph may then be merged to create larger aggregates (e.g., aggregates of four vertices, etc.). For example, each aggregate of two vertices formed during the one-phase handshaking method 300 may be represented as a single vertex in a new graph, and the one-phase handshaking method 300 may be repeated on the new graph.

In another example, each vertex within an aggregate may select a neighbor vertex (other than the other vertex within the aggregate) based on one or more criteria. Further, each vertex in the aggregate determines whether a mutual selection exists between the vertex and the neighbor vertex of the graph. Further still, the strongest mutual selection may be determined for the aggregate. For example, the neighbor vertex with the largest number of edges that is engaged in mutual selection with a vertex of the aggregate may be determined.

Figure 5:
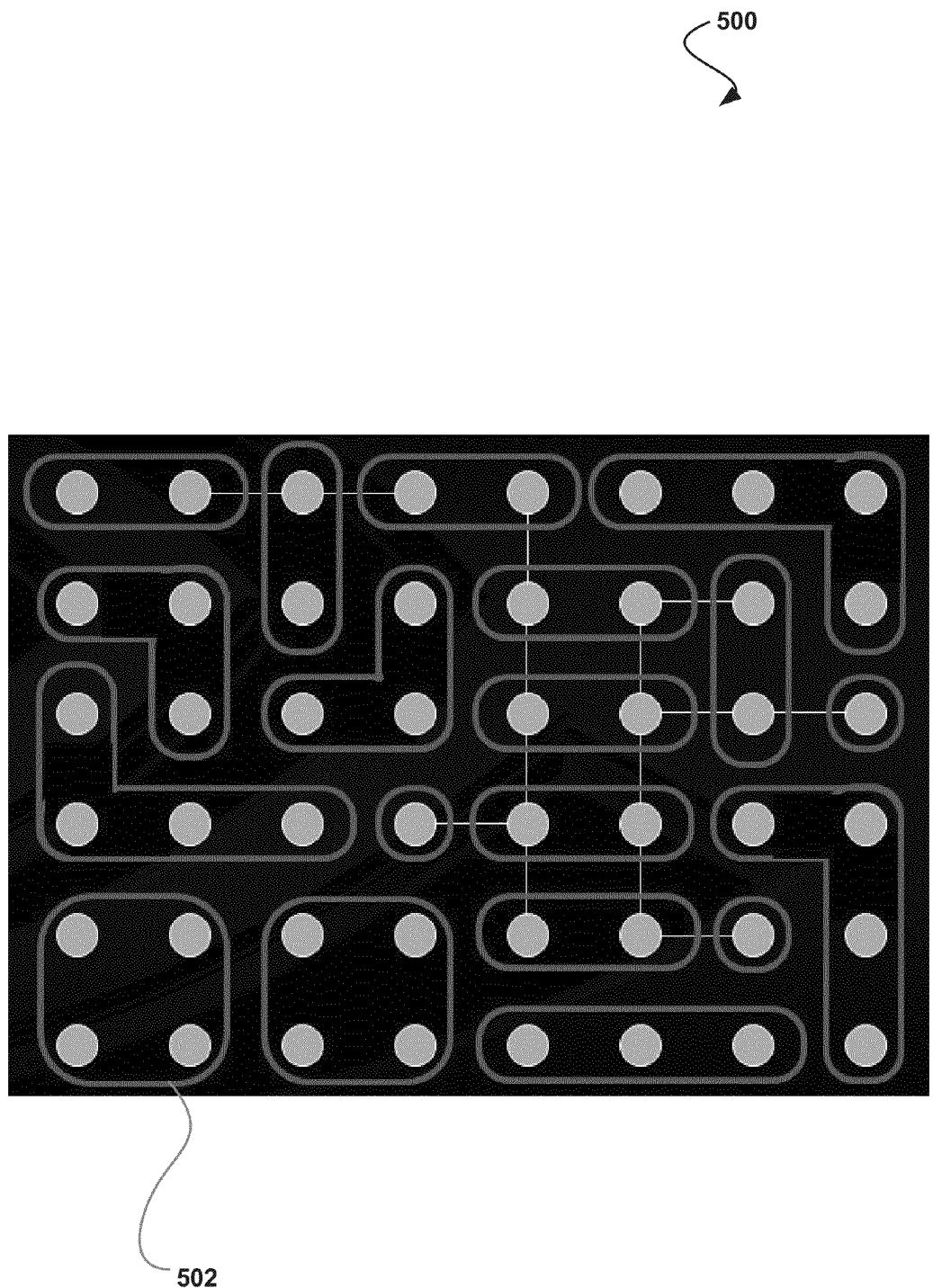
FIG. 5 shows another exemplary graph, in accordance with yet another embodiment.

Also, in one embodiment, the strongest mutual selection may be merged with the aggregate to create a larger aggregate. For example, another exemplary graph is shown in FIG. 5 where a first aggregate containing a neighbor vertex with the largest number of edges that is engaged in mutual selection with a vertex of a second aggregate may be merged with the second aggregate to form a larger aggregate 502 with a total of four vertices. In this way, the need to make an intermediate graph may be avoided when aggregating more than two vertices.

Figure 6:
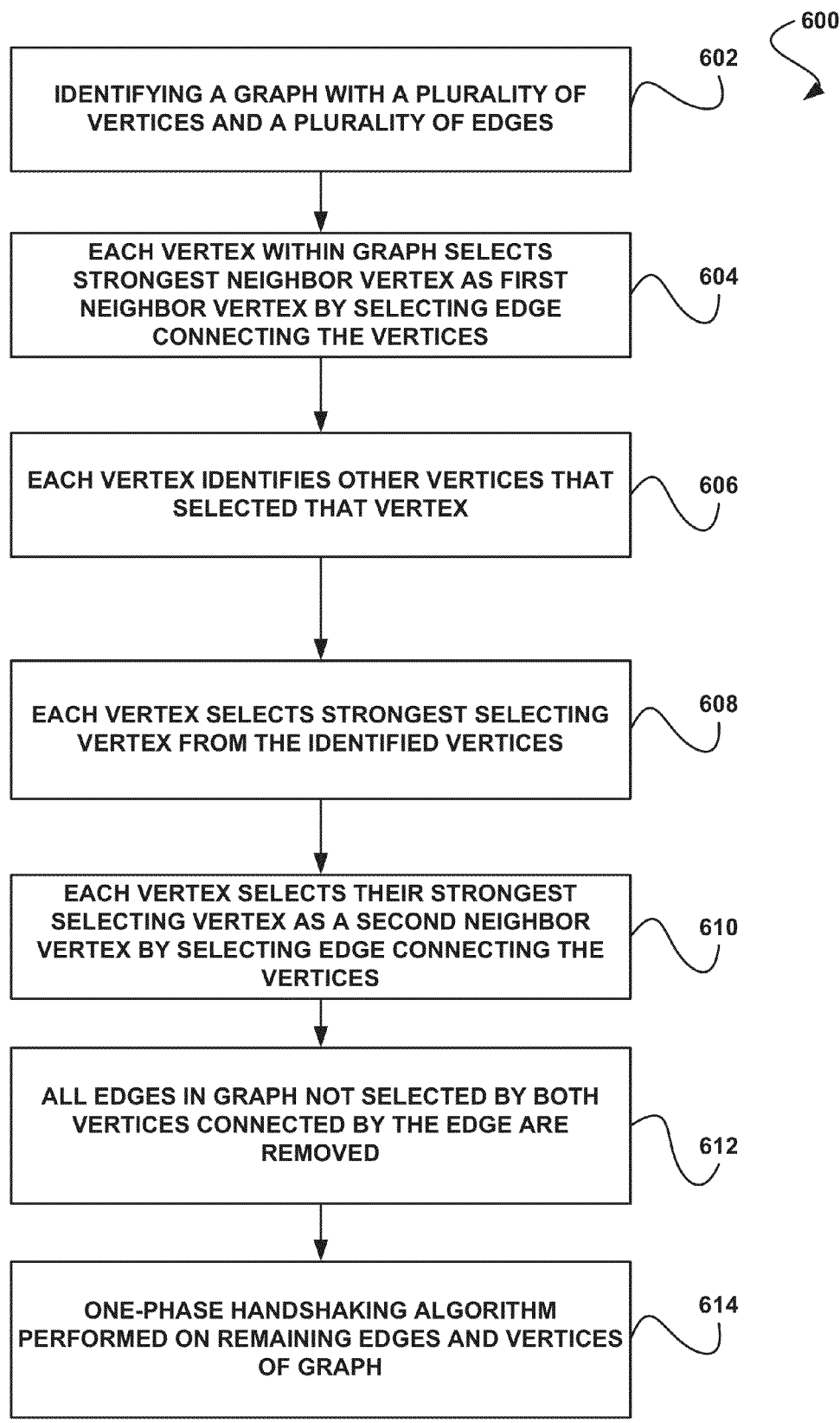
FIG. 6 shows a two-phase handshaking method for performing graph matching in parallel, in accordance with yet another embodiment.

FIG. 6 shows a two-phase handshaking method 600 for performing graph matching in parallel, in accordance with another embodiment. As an option, the method 600 may be carried out in the context of the functionality of FIGS. 1-5. Of course, however, the method 600 may be implemented in any desired environment. It should also be noted that the aforementioned definitions may apply during the present description.

As shown in operation 602, a graph with a plurality of vertices and a plurality of edges is identified. Additionally, as shown in operation 604, each vertex within the graph selects their strongest neighbor vertex as a first neighbor vertex by selecting the edge connecting the vertex to the strongest selecting vertex. Further, as shown in operation 606, each single vertex within the graph identifies other vertices within the graph that selected that single vertex during operation 604. Further still, as shown in operation 608, each vertex within the graph determines a strongest selecting vertex from the vertices within the graph identified in operation 606, where such strongest selecting vertex contains the most edges of all the vertices within the graph that selected that vertex. In one embodiment, each vertex within the graph may determine a selecting vertex from the vertices within the graph identified in operation 606 based on criteria other than strength. For example, each vertex within the graph may arbitrarily determine a selecting vertex from the vertices within the graph identified in operation 606.

Also, as shown in operation 610, each vertex within the graph selects their strongest selecting vertex as a second neighbor vertex by selecting the edge connecting the vertex to the strongest selecting vertex. In addition, as shown in operation 612, all edges within the graph that were not selected by both vertices connected by the edge in operation 604 and operation 610 are removed from the graph. Furthermore, as shown in operation 614, a one-phase handshaking algorithm (e.g., the one-phase handshaking method for performing graph matching in parallel illustrated in FIG. 3, etc.) is performed on the remaining edges and vertices of the graph. In this way the amount of unassigned vertices remaining after each iteration may be reduced.

Figure 7:
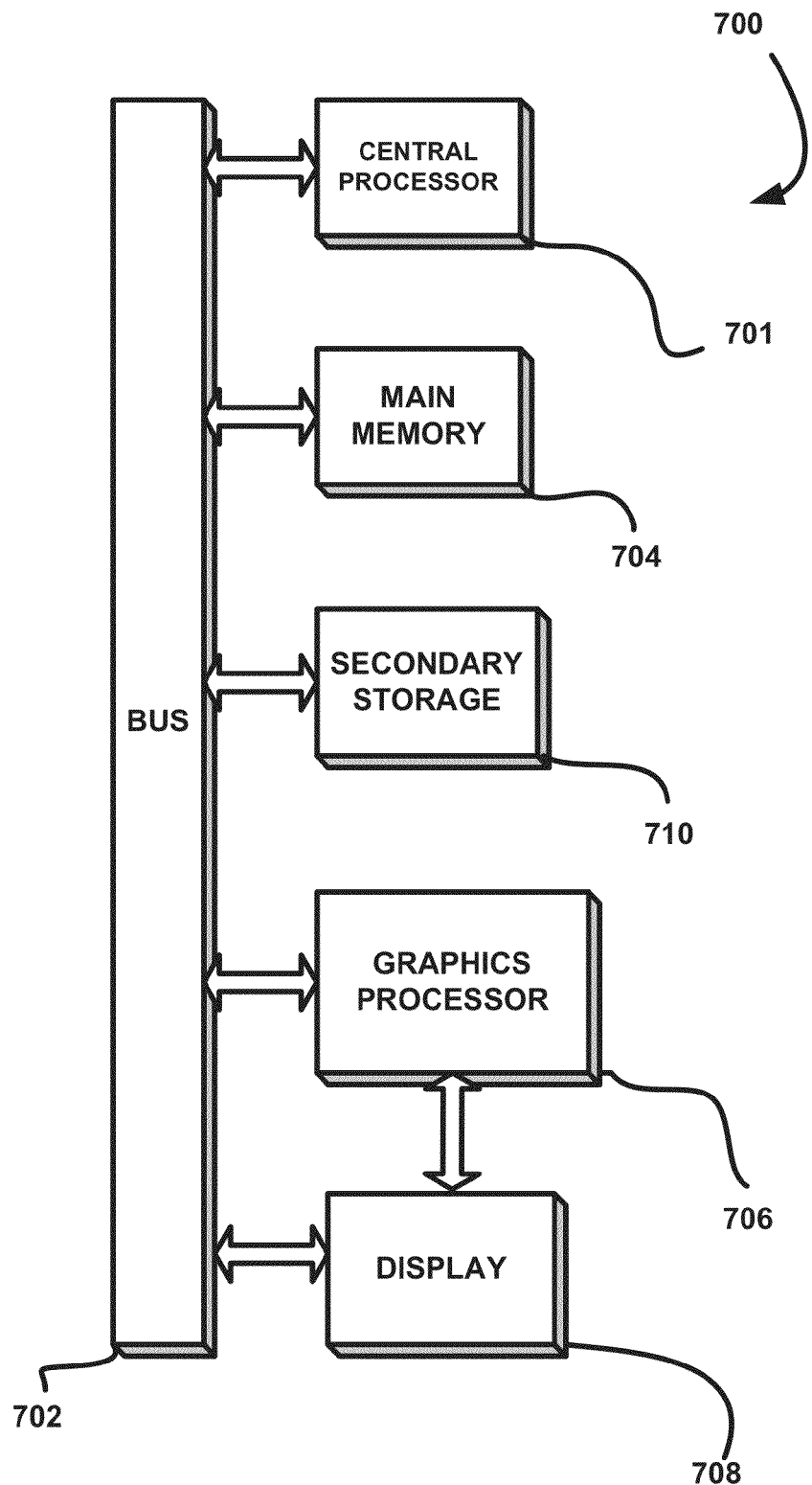
FIG. 7 illustrates an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one host processor 701 which is connected to a communication bus 702. The system 700 also includes a main memory 704. Control logic (software) and data are stored in the main memory 704 which may take the form of random access memory (RAM).

The system 700 also includes a graphics processor 706 and a display 708, i.e. a computer monitor. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710 and/or any other storage are possible examples of computer-readable media.

In one embodiment, the architecture and/or functionality of the various previous figures may be implemented in the context of the host processor 701, graphics processor 706, an integrated circuit (not shown) that is capable of at least a portion of the capabilities of both the host processor 701 and the graphics processor 706, a chipset a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, laptop computer, and/or any other type of logic. Still yet, the system 700 may take the form of various other devices m including, but not limited to a personal digital assistant (PDA) device, a mobile phone device, a television, etc.

Further, while not shown, the system 700 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
  identifying a graph with a plurality of vertices and a plurality of edges; and
  performing aggregation on the vertices and the edges of the graph to return a new graph by:
    in a first operation, each vertex within the graph selects a strongest neighbor vertex as a first neighbor vertex by selecting an edge connecting the vertex to the strongest neighbor vertex to produce a first set of selected edges,
    in a second operation, each vertex within the graph identifies other vertices that selected the vertex,
    in a third operation, each vertex within the graph selects a strongest selecting vertex from the identified other vertices as a second neighbor;
    in a fourth operation, each vertex within the graph selects an edge connecting the vertex to the strongest selecting vertex to produce a second set of selected edges;
    in a fifth operation, removing edges of the graph that are not included in either the first set or the second set of selected edges to produce the new graph comprising the plurality of vertices and remaining edges of the plurality of edges;

performing graph matching on the new graph to detect mutual selection vertices of the new graph that are associated with the remaining edges; and for each of the remaining edges, connecting a pair of the mutual selection vertices, collapsing the remaining edge in a data-parallel manner such that each of the remaining edges are collapsed in parallel to merge the pair of the mutual selection vertices and create single new vertex.

2. The method of claim 1, wherein the graph matching is performed in a data-parallel manner that includes considering each element in the graph independent of all other elements in the graph during the performance of the graph matching.

3. The method of claim 1, wherein the graph matching is performed on the new graph in a data-parallel manner utilizing a one-phase handshaking method.

4. The method of claim 3, wherein utilizing the one-phase handshaking method, a single vertex within the new graph selects one or more neighbor vertices.

5. The method of claim 4, wherein utilizing the one-phase handshaking method, the single vertex within the new graph selects the one or more neighbor vertices according to one or more criteria.

6. The method of claim 5, wherein the single vertex within the new graph selects the one or more neighbor vertices according to a maximal matching criteria.

7. The method of claim 4, wherein the single vertex within the new graph selects the one or more neighbor vertices randomly.

8. The method of claim 3, wherein the one-phase handshaking method is performed over a plurality of iterations.

9. The method of claim 3, wherein the one-phase handshaking method is performed until one or more criteria are met.

10. A computer program product embodied on a non-transitory computer readable medium, comprising:
code for identifying a graph with a plurality of vertices and a plurality of edges; and
code for performing aggregation on the vertices and the edges of the graph to return a new graph by:
in a first operation, each vertex within the graph selects a strongest neighbor vertex as a first neighbor vertex by selecting an edge connecting the vertex to the strongest neighbor vertex to produce a first set of selected edges,
in a second operation, each vertex within the graph identifies other vertices that selected the vertex,
in a third operation, each vertex within the graph selects a strongest selecting vertex from the identified other vertices as a second neighbor;
in a fourth operation, each vertex within the graph selects an edge connecting the vertex to the strongest selecting vertex to produce a second set of selected edges;
in a fifth operation, removing edges of the graph that are not included in either the first set or the second set of selected edges to produce the new graph comprising the plurality of vertices and remaining edges of the plurality of edges;
performing graph matching on the new graph to detect mutual selection vertices of the new graph that are associated with the remaining edges; and
for each of the remaining edges, connecting a pair of the mutual selection vertices, collapsing the remaining edge in a data-parallel manner such that each of the remaining edges are collapsed in parallel to merge the pair of the mutual selection vertices and create single new vertex.

11. A system, comprising:
a graphics processing unit for:
identifying a graph with a plurality of vertices and a plurality of edges, and performing aggregation on the vertices and the edges of the graph to return a new graph by:
in a first operation, each vertex within the graph selects a strongest neighbor vertex as a first neighbor vertex by selecting an edge connecting the vertex to the strongest neighbor vertex to produce a first set of selected edges,
in a second operation, each vertex within the graph identifies other vertices that selected the vertex,
in a third operation, each vertex within the graph selects a strongest selecting vertex from the identified other vertices as a second neighbor;
in a fourth operation, each vertex within the graph selects an edge connecting the vertex to the strongest selecting vertex to produce a second set of selected edges;
in a fifth operation, removing edges of the graph that are not included in either the first set or the second set of selected edges to produce the new graph comprising the plurality of vertices and remaining edges of the plurality of edges;
performing graph matching on the new graph to detect mutual selection vertices of the new graph that are associated with the remaining edges; and
for each of the remaining edges, connecting a pair of the mutual selection vertices, collapsing the remaining edge in a data-parallel manner such that each of the remaining edges in the set are collapsed in parallel to merge the pair of the mutual selection vertices and create single new vertex.

12. The system of claim 11, wherein the parallel processor is coupled to memory via a bus.

13. The method of claim 1, further including creating at least one new edge within the new graph, wherein the at least one new edge is created within the new graph to connect one of the single new vertices with a second new vertex.

14. The method of claim 1, wherein each vertex of the graph that is merged into one of the single new vertices of the new graph is associated with a reference to the corresponding single new vertex after the collapsing.

15. The computer program product of claim 10, wherein the graph matching is performed in a data-parallel manner that includes considering each element in the graph independent of all other elements in the graph during the performance of the graph matching.

16. The computer program product of claim 10, wherein the graph matching is performed on the new graph in a data-parallel manner utilizing a one-phase handshaking method.

17. The computer program product of claim 16, wherein utilizing the one-phase handshaking method, a single vertex within the new graph selects one or more neighbor vertices.

18. The system of claim 11, wherein the graph matching is performed in a data-parallel manner that includes considering each element in the graph independent of all other elements in the graph during the performance of the graph matching.

19. The system of claim 11, wherein the graph matching is performed on the new graph in a data-parallel manner utilizing a one-phase handshaking method.

20. The system of claim 19, wherein utilizing the one-phase handshaking method, a single vertex within the new graph selects one or more neighbor vertices.

* * * * *